United States Patent
Murata et al.

(10) Patent No.: US 10,759,661 B2
(45) Date of Patent: Sep. 1, 2020

(54) OZONE GENERATION APPARATUS

(71) Applicant: Kabushiki Kaisha Toshiba, Tokyo (JP)

(72) Inventors: Takaaki Murata, Kanagawa-ken (JP); Yuji Okita, Kanagawa-ken (JP); Kiyoyuki Amemori, Kanagawa-ken (JP); Kie Kubo, Tokyo (JP); Ryutaro Makise, Kanagawa-ken (JP); Kazuhiko Noda, Tokyo (JP); Ryoichi Takahashi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/136,286

(22) Filed: Apr. 22, 2016

(65) Prior Publication Data
US 2016/0236933 A1    Aug. 18, 2016

Related U.S. Application Data

(63) Continuation of application No. 14/487,445, filed on Sep. 16, 2014, now abandoned, which is a (Continued)

(30) Foreign Application Priority Data

Mar. 16, 2012   (JP) .................................. 2012-059696

(51) Int. Cl.
   *C01B 13/11*     (2006.01)
   *B01J 19/08*     (2006.01)
(52) U.S. Cl.
   CPC ........... *C01B 13/115* (2013.01); *B01J 19/088* (2013.01); *C01B 13/11* (2013.01); (Continued)
(58) Field of Classification Search
   CPC ... C01B 13/11; C01B 13/115; C01B 2201/22; C01B 2201/32; C01B 2201/76; (Continued)

(56) References Cited

U.S. PATENT DOCUMENTS

| 4,725,412 A | 2/1988 | Ito |
| 5,759,497 A * | 6/1998 | Kuzumoto ............. C01B 13/11 |
| | | 422/186.07 |

(Continued)

FOREIGN PATENT DOCUMENTS

| CA | 2 832 718 A1 | 10/2012 |
| DE | 40 14 169 A1 | 11/1990 |

(Continued)

OTHER PUBLICATIONS

Combined Search Report and Written Opinion dated Jun. 4, 2015 in Singapore Patent Application No. 11201405767T.

(Continued)

*Primary Examiner* — Xiuyu Tai
(74) *Attorney, Agent, or Firm* — Oblon, McClelland, Maier & Neustadt, L.L.P.

(57) ABSTRACT

An ozone generation apparatus includes a cylindrical shaped first electrode, a cylindrical shaped second electrode disposed coaxially with the first electrode and disposed in the first electrode, a dielectric disposed between the first electrode and the second electrode. Dry air is supplied between the first electrode and the second electrode as raw material gas. A discharge gap length d formed by the first electrode, the second electrode, and the dielectric is set to be in a range of 0.3 to 0.5 mm. A pd product, which is a product of the discharge gap length d and a gas pressure p of the raw material gas, is in a range of 6 to 16 kPa·cm. And the discharge gap length d and the gas pressure p of the raw material gas are set to satisfy following expression.

5 Claims, 3 Drawing Sheets

Related U.S. Application Data continuation of application No. PCT/JP2013/000805, filed on Feb. 14, 2013.

(52) U.S. Cl.
CPC ... *B01J 2219/0809* (2013.01); *C01B 2201/22* (2013.01); *C01B 2201/30* (2013.01); *C01B 2201/32* (2013.01); *C01B 2201/62* (2013.01); *C01B 2201/76* (2013.01)

(58) Field of Classification Search
CPC ............ C01B 2201/12; C01B 2201/14; C01B 2201/24; C01B 2201/34; C01B 2201/60; C01B 2201/66; C01B 2201/74; C01B 2201/90; C01B 2201/64; B01J 19/088; B01J 2219/0809; Y10T 29/49124; Y10T 29/49155

See application file for complete search history.

(56) References Cited

U.S. PATENT DOCUMENTS

| | | |
|---|---|---|
| 6,395,239 B1 | 5/2002 | Tabata et al. |
| 7,695,691 B2 | 4/2010 | Orishima et al. |
| 2003/0194358 A1 | 10/2003 | Minter |
| 2006/0024220 A1* | 2/2006 | Orishima ................ C01B 13/11 422/186.07 |
| 2009/0236042 A1* | 9/2009 | Wada ...................... C01B 13/11 156/345.43 |
| 2010/0296980 A1 | 11/2010 | Nakatani et al. |
| 2010/0296981 A1 | 11/2010 | Takauchi et al. |
| 2012/0308440 A1* | 12/2012 | Owens .................... C01B 13/11 422/186.07 |

FOREIGN PATENT DOCUMENTS

| | | |
|---|---|---|
| EP | 1 052 221 A1 | 11/2000 |
| EP | 1 291 320 A1 | 3/2003 |
| GB | 2 454 458 A | 5/2009 |
| JP | 10-182109 A | 7/1998 |
| JP | 10-338503 A | 12/1998 |
| WO | WO 2007/014473 A1 | 2/2007 |

OTHER PUBLICATIONS

Office Action dated Mar. 18. 2016 in Canadian Patent Application No. 2,867,459.

Office Action dated Apr. 24. 2020 in Canadian Patent Application No. 2,867,459.

\* cited by examiner

OZONE GENERATION APPARATUS

CROSS-REFERENCE TO RELATED APPLICATION(S)

This application is a continuation of U.S. application Ser. No. 14/487,445, filed Sep. 16, 2014, which is a continuation application of International Application No. PCT/JP2013/000805, filed Feb. 14, 2013, and claims the benefit of priority from Japanese Patent Application No. 2012-059696, filed Mar. 16, 2012, the contents of each of which are hereby incorporated by reference.

FIELD

Embodiments of the present invention relate to an ozone generation apparatus.

BACKGROUND

A general ozone generation apparatus includes a dielectric electrode and a metal electrode disposed in an airtight vessel. A ring-shaped spacer is inserted between the dielectric electrode and the metal electrode to form a discharge gap. A conductive film is provided on an inner circumference face of the dielectric electrode.

In such an ozone generation apparatus, a raw material gas introduced from a gas inlet into the airtight vessel flows through the discharge gap between the dielectric electrode and the metal electrode, and flows out from a gas outlet.

If a high AC voltage is applied between the dielectric electrode and the metal electrode in parallel with the introduction of the raw material gas, dielectric barrier discharge is formed in the discharge gap and ozone is generated. By the way, dielectric barrier discharge is called simply barrier discharge or silent discharge sometimes.

Heat generated by the dielectric barrier discharge is cooled by cooling water supplied into a cooling water flow path formed by the metal electrode and the airtight vessel. As a result, temperature rise of gas in the discharge gap is suppressed and ozone is obtained efficiently.

In a general conventional ozone generation apparatus, a discharge gap length d is set to be in the range of 0.6 to 1.3 mm. And a gas pressure p of air which is raw material gas is set to be in the range of 0.17 to 0.28 MPa (absolute pressure).

The product of the gas pressure p of the raw material gas and the discharge gap length d is generally called pd product. The law of discharge similarity holds true by making the pd product constant. This is because the pd product represents the number of gas molecules in the discharge gap.

Multiplication of electrons travelling in the discharge gap is represented by the product of the ionization coefficient $\alpha$ of the gas and the discharge gap length d. The $\alpha d$ product is represented by $$\alpha d = (\alpha/p)(pd)$$

Here, $\alpha/p$ represents ionization caused by single collision, and the pd product represents the number of molecules contained in the discharge gap. This is the reason why the famous Paschen's raw giving a discharge start voltage is a function of the pd product.

DETAILED DESCRIPTION

An ozone generation apparatus according to an embodiment includes a cylindrical shaped first electrode, a cylindrical shaped second electrode disposed coaxially with the first electrode and disposed in the first electrode, a dielectric disposed between the first electrode and the second electrode, and a power supply for applying a voltage between the first electrode and the second electrode. Dry air is supplied between the first electrode and the second electrode as raw material gas, a voltage is supplied between the first electrode and the second electrode from the power supply to generate discharge, and ozone is generated by the discharge. A discharge gap length d formed by the first electrode, the second electrode, and the dielectric is set to be in a range of 0.3 to 0.5 mm. In addition, a pd product, which is a product of the discharge gap length d and a gas pressure p of the raw material gas, is in a range of 6 to 16 kPa·cm. And the discharge gap length d and the gas pressure p of the raw material gas are set to satisfy expression $$(pd - 250d - 3.16)^2 + 150d \leq 12.5$$

Embodiments will now be described.

Embodiments

Figure 1:
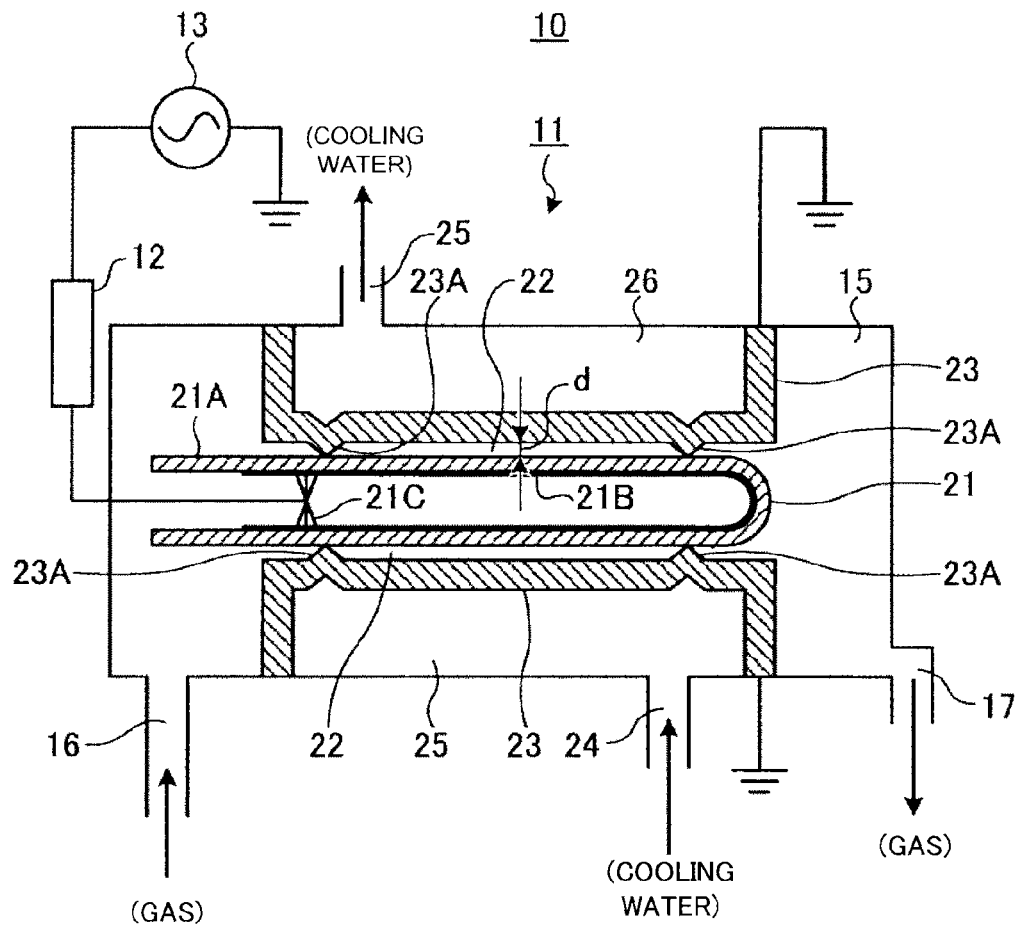
FIG. 1 is a diagram for explaining a schematic configuration of an ozone generation apparatus according to an embodiment.

FIG. 1 shows a schematic configuration of an ozone generation apparatus according to an embodiment.

An ozone generation apparatus 10 according to the embodiment is an ozone generation apparatus of dielectric barrier discharge type. Roughly dividing, an ozone generation apparatus 10 includes an ozone generation apparatus main body 11 and a high voltage power supply 13. The high voltage power supply 13 is a high voltage AC power supply, and supplies power to the ozone generation apparatus main body 11 via a fuse 12.

The ozone generation apparatus main body 11 includes an airtight vessel 15. A gas inlet 16 is provided in a first end portion of the airtight vessel 15 to introduce raw material gas. A gas outlet 17 is provided in a second end portion of the airtight vessel 15 to eject unreacted raw material gas and ozone ($O_3$).

A cylindrical shaped metal electrode (first electrode) 23 made of stainless steel and a cylindrical shaped dielectric electrode 21 are disposed in the airtight vessel 15. Both ends of the metal electrode 23 are hermetically joined to inside of the airtight vessel 15. The metal electrode 23 and the airtight vessel 15 form an airtight region. The dielectric electrode 21 is disposed inside the metal electrode 23. A predetermined discharge gap 22 is formed between an outer circumference face of the dielectric electrode 21 and the metal electrode 23. By the way, a plurality of projections 23A is formed on an inner circumference face of the metal electrode 23 to form and maintain the discharge gap 22.

A cooling water inlet 24 which introduces cooling water and a cooling water outlet 25 which ejects cooling water are provided in a portion of the airtight vessel 15 opposed to an outer circumference face (rear face) of the metal electrode 23. The metal electrode 23 and the portion of the airtight vessel 15 opposed to the outer circumference face of the metal electrode 23 form a cooling water flow path 26 between the cooling water inlet 24 and the cooling water outlet 25.

The dielectric electrode 21 includes a cylindrical shaped dielectric 21A, a conductive electrode (second electrode) 21B, and a high voltage feeding terminal 21C. The cylindrical shaped dielectric 21A is formed of quartz glass or the like which is small in thermal expansion coefficient. The conductive electrode 21B is formed on an inner circumference face of the cylindrical shaped dielectric 21A. The conductive electrode 21B is cylindrical shaped. The high voltage feeding terminal 21C is inserted into the cylindrical shaped dielectric 21A, and connected to the conductive electrode 21B. Furthermore, the high voltage feeding terminal 21C is connected to the high voltage power supply 13 via the fuse 12.

The cylindrical shaped dielectric 21A is formed of quartz glass, borosilicate glass, high silica glass, aluminosilicate glass, ceramics or the like.

The conductive electrode 21B is a conductive film formed on the inner circumference face of the cylindrical shaped dielectric 21A by using a film forming method such as sputtering, thermal spraying, deposition, electroless plating, electroplating, or paintwork. As a conductive material, gold, silver, copper, stainless steel, chrome, tin, zinc, nickel carbon, or aluminum is used.

In the above-described configuration, the discharge gap length d corresponding to the distance of the discharge gap 22 is set equal to a value in the range of 0.3 to 0.5 mm which is shorter than a discharge gap length of a general conventional ozone generation apparatus in the range of 0.6 to 1 mm.

The raw material gas is gas that contains oxygen. For example, the raw material gas is dry air. Raw material gas pressure p which is pressure of the raw material gas (air) is set to cause the pd product which is the product of the discharge gap length d and the raw material gas pressure p to be in the range of 6 to 16 kPa·cm.

In addition, in the present embodiment, the raw material gas pressure p (kpa) and the gap length d (cm) are set to satisfy the following expression.

$$(pd-250d-3.16)^2+150d \leq 12.5$$

Hereafter, the raw material gas pressure p (kpa) and the gap length d (cm) will be described in more detail.

Figure 2:
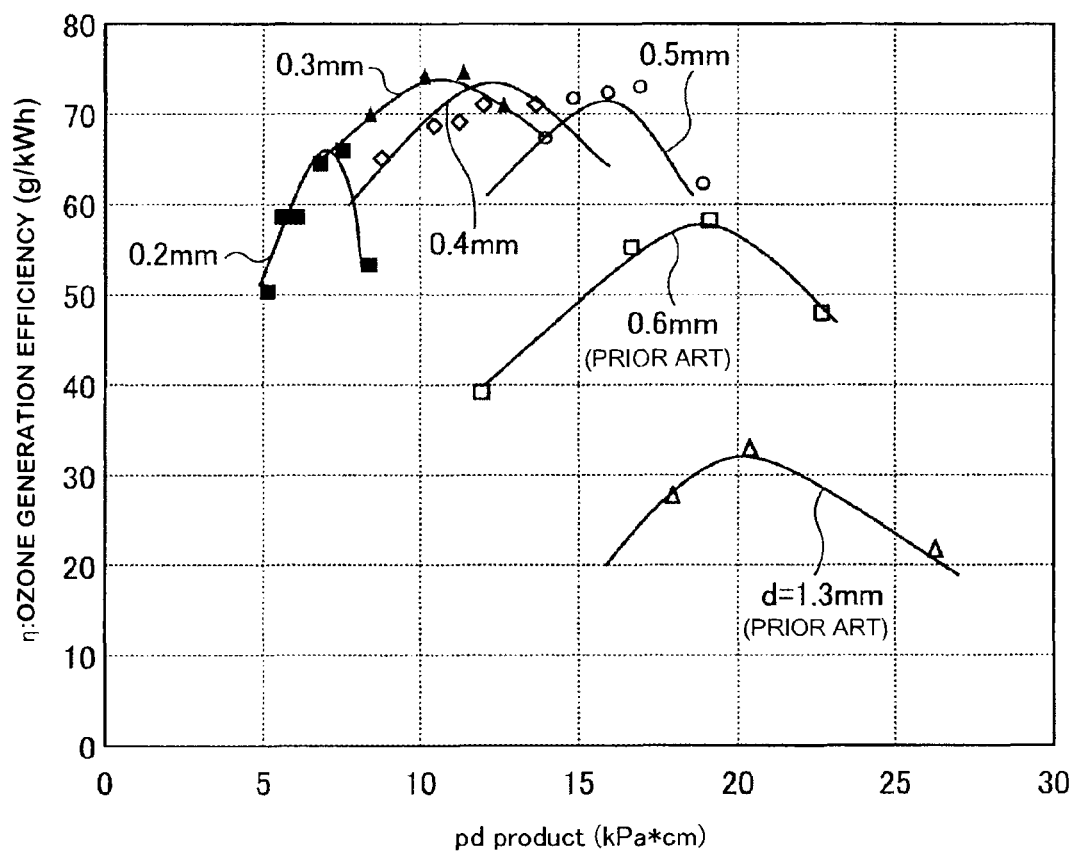
FIG. 2 is a diagram for explaining relations between the pd product and the ozone generation efficiency in the ozone generation apparatus according to the embodiment.

FIG. 2 is a diagram for explaining relations between the pd product and the ozone generation efficiency in the ozone generation apparatus according to the embodiment. In FIG. 2, the abscissa axis represents the pd product (kPa·cm) and the ordinate axis represents the ozone generation efficiency (g/kWh). In an example shown in FIG. 2, ozone generation is conducted by using the discharge gap length d as a parameter under the condition that the ozone concentration is 40 g/Nm³ and the power density is 3 kW/m² and constant.

As for graphs with the discharge gap length d=0.6 mm and 1.3 mm in FIG. 2, values in the conventional ozone generation apparatus are indicated for reference. The following is appreciated from FIG. 2. In the conventional ozone generation apparatuses with the discharge gap length d=0.6 mm and 1.3 mm, an optimum value of the pd product for the ozone generation efficiency is approximately 20 kPa·cm and this value does not depend upon the discharge gap length d.

On the other hand, in the ozone generation apparatus 10 of the present embodiment having a discharge gap length d shorter than a discharge gap length in the conventional ozone generation apparatus, if the discharge gap length d becomes shorter as indicated by 0.5 mm→0.4 mm→0.3 mm, the pd product shifts to a smaller value whereas the ozone generation efficiency increases.

At the discharge gap length d=0.2 mm, the optimum value of the pd product falls to 7.6 kPa·cm. However, the ozone generation efficiency at the discharge gap length d=0.2 mm is less than the ozone generation efficiency at the discharge gap length d=0.3 mm.

Therefore, the following is appreciated from FIG. 2. To obtain high ozone generation efficiency (at least 60 g/kWh), it is necessary that the discharge gap length d is in the range of 0.3 to 0.5 mm, and the pd product, which is the product of the discharge gap length d and the gas pressure p of the raw material gas, is in the range of 6 to 16 kPa·cm.

Furthermore, it is appreciated that the ozone generation efficiency η(g/kWh) must satisfy Expression (2) in a case where the discharge gap length d and the pd product are in the above-described ranges.

$$\eta=-(pd-250d-3.16)^2-150d+79.5 \quad (2)$$

An ozone generation efficiency that is 10% lower than the highest ozone generation efficiency 75 g/kwh is 67 g/kWh. To obtain an ozone generation efficiency of at least 67 g/kWh, it is necessary according to Expression (2) to satisfy

In other words, it is necessary that the gas pressure p (kPa) of the raw material gas and the discharge gap length d (cm) satisfy Expression (3).

$$(pd-250d-3.16)^2+150d \leq 12.5 \quad (3)$$

As described heretofore, the ozone generation apparatus according to the present embodiment can generate ozone with a high ozone generation efficiency of at least 67 g/kWh.

Figure 3:
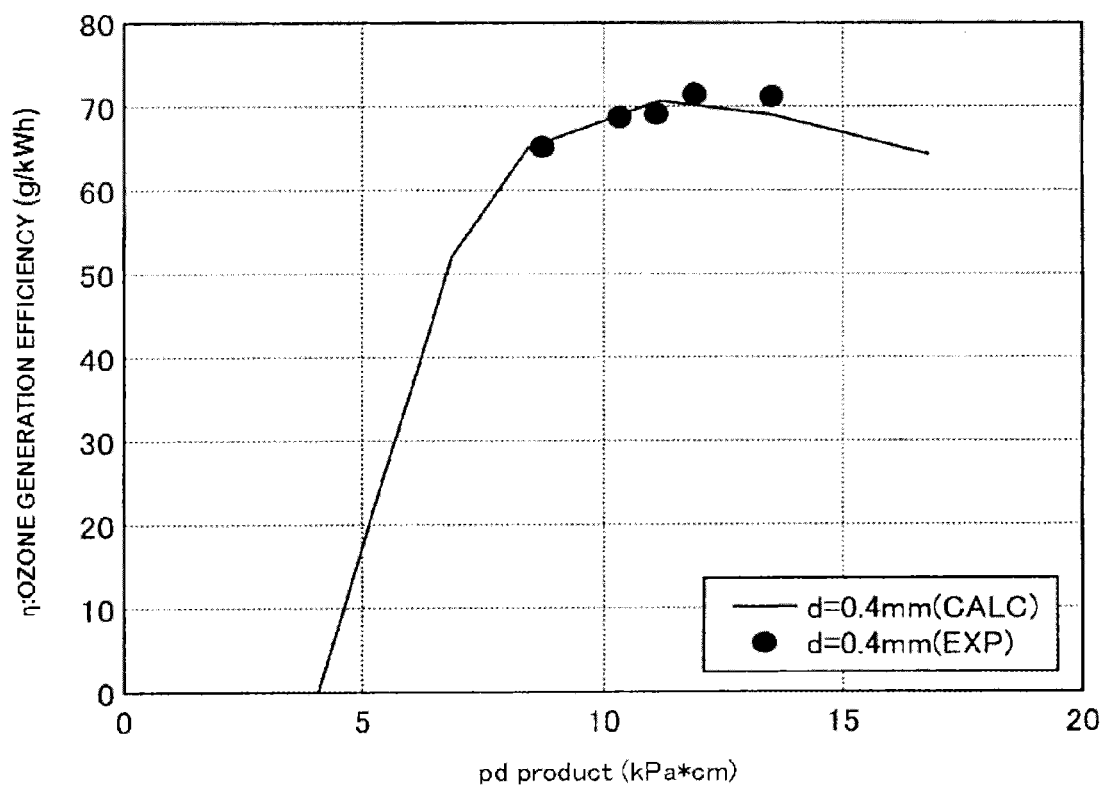
FIG. 3 is a diagram for explaining the relations between the pd product and the ozone generation efficiency in the ozone generation apparatus according to the embodiment in more detail.

FIG. 3 is a diagram for explaining the relations between the pd product and the ozone generation efficiency n in the ozone generation apparatus according to the embodiment in more detail. FIG. 3 shows the ozone generation efficiency η at the time when the discharge gap length d is set equal to d=0.4 mm and constant. In FIG. 3, black circles (●) indicate experimental values and a solid line indicates a simulation result of an ozone generation simulator developed by the present inventors.

In an area where the pd product is less than 10 kPa·cm, a three body collision action represented by Expression (4) in which ozone O₃ is generated by collision among an oxygen atom O, an oxygen molecule O₂, and a neutral molecule M, becomes a principal cause of an ozone generation action.

In this area, higher ozone generation efficiency is obtained as the gas pressure becomes higher.

When the pd product becomes approximately 10 kPa·cm, the ozone generation efficiency becomes nearly constant. If the gas pressure becomes further higher, i.e., the pd product becomes higher, the gas temperature rises due to discharge compression called filament discharge during discharge. As a result, the ozone generation efficiency falls from the saturation. This reaction is represented by Expression (5).

$$O+O_3 \rightarrow 2O_2 \quad (5)$$

And the reaction represented by Expression (5) is advanced by temperature rise, and ozone is decomposed.

In the ozone generation apparatus 10 according to the present embodiment, the discharge gap length d is in the range of 0.3 to 0.5 mm. To implement this discharge gap length d with high precision, a conventionally used ring shaped spacer inserted into the discharge gap (space) cannot be used. The reason is that the spacer itself has a thickness in the range of 0.1 to 0.3 mm. If the spacer is provided on an outer circumference face of the dielectric electrode 21, the spacer fills a gas passage space and consequently the raw material gas does not flow and ozone generation cannot be conducted.

Therefore, at least three projections 23A are formed on a circumference of the inner circumference face of the metal electrode 23 integrally with the metal electrode 23 as shown in FIG. 1. Or at least three projections are formed on a circumference of an outer circumference of the cylindrical shaped dielectric 21A included in the dielectric electrode 21 integrally with the cylindrical shaped dielectric 21A. As a result, it is possible to hold the dielectric electrode 21 coaxially in the metal electrode 23 with high precision. These projections have a height which is equal to the discharge gap length.

The above-described projection 23A is formed by pressing a metal edge against a pipe made of stainless steel, which is the metal electrode 23, and crushing the pipe. Furthermore, it is also possible to form the projection 23A by using a dice having a cut in a part when manufacturing the metal electrode in extrusion of a pipe. In these cases, the projection 23A is formed of the same material as the metal electrode 23. The projection 23A comes in contact with the outer circumference face of the cylindrical shaped dielectric 21A.

It is possible to provide a projection on the surface of the cylindrical shaped dielectric 21A included in the dielectric electrode 21 by attaching fused glass of the same material as that of the cylindrical shaped dielectric 21A to the surface of the cylindrical shaped dielectric 21A. The projection comes in contact with the inner circumference face of the metal electrode 23.

According to the present embodiment, it is possible to make the gas pressure p less than 0.3 MPa by using an area where the pd product is smaller than that in the conventional apparatus, even if a discharge gap length d in the range of 0.3 to 0.5 mm which is smaller than that in the conventional apparatus is used. As a result, the thickness of the airtight vessel 15 (casing) in the ozone generation apparatus 10 can be made thin, and consequently it becomes possible to generate ozone with lightweight, inexpensiveness, and a high efficiency.

According to an example of the present embodiment, the conductive electrode 21B in the dielectric electrode 21 is formed by means of a sputtering method using stainless steel as a target. As a result, it is possible to prevent the dielectric electrode 21, which is the high voltage side electrode, from corroding over a long period even if nitric acid, which is a secondary product of ozone and discharge, is generated, and generate ozone with a stable ozone concentration and a high efficiency. Furthermore, it is also possible to form the dielectric electrode 21, which is a high voltage electrode, by using cylindrical glass functioning as the cylindrical shaped dielectric 21A and the conductive electrode 21B formed on an inner circumference face of the cylindrical glass by nickel plating.

By the way, in the above-described ozone generation apparatus 10, a discharge power density W/S can be represented by Expression (6).

$$W/S = C_g \cdot f \cdot 2V^* \{2V_{op} - (1 + C_0/C_g) \cdot 2V^*\} \quad (6)$$

Here, W is power, f is a power supply frequency, V* is a self-sustaining discharge voltage, $V_{op}$ is an applied voltage, $C_0$ is capacitance of the discharge gap per unit area, and Cg is capacitance of glass per unit area. The self-sustaining discharge voltage V* is represented by Expression (7).

$$V^* = 203pd + 900 - 400 \exp(-pd/6.66) \quad (7)$$

Therefore, the self-sustaining discharge voltage V* becomes a function of the pd product. In other words, the self-sustaining discharge voltage V* is proportionate to the pd product.

As described above, when the discharge gap length d in the conventional ozone generation apparatus is 1.3 mm and 0.6 mm, the optimum value of the pd product for the ozone generation efficiency is 20 kPa·cm and nearly constant. In the ozone generation apparatus 10 according to the embodiment, however, the discharge gap length d is made as small as 0.3 to 0.5 mm and the pd product, which is the product of the discharge gap length d and the gas pressure p of the raw material gas, is made as small as 6 to 16 kPa·cm. This pd product value is in the range of 0.3 to 0.8 times the conventional pd product value (20 kPa·cm). Therefore, the self-sustaining discharge voltage represented by Expression (7) becomes 0.3 times the conventional self-sustaining discharge voltage at minimum.

In the present embodiment as well, it is necessary to use the discharge power density W/S which can be used according to Expression (6). The apparatus volume is proportionate to the discharge power density W/S. In the case where the same cooling capacity as that of the conventional apparatus is used, therefore, it is necessary to use at least the same discharge power density W/S as that of the conventional apparatus.

To throw in a discharge power density of at least the same quantity, it is necessary to make the frequency of the power supply higher than 1 kHz, which is the conventional frequency. Specifically, it becomes necessary to make the frequency in the range of 1 to 3.5 kHz. If the frequency of the power supply is set to 10 kHz or higher, the power supply generates a radio wave in general. However, radio wave noise generated by the power supply can be suppressed and the ozone generation apparatus can generate ozone with a high efficiency by bringing the frequency of the power supply into the range of 1 to 3.5 kHz.

And it is possible to form ozone water by, for example, conducting bubbling of ozone gas $O_3$ generated in water. Ozone formed by using the ozone generation apparatus 10 according to the embodiment, or ozone water utilizing the ozone is applied to, for example, water processing technology and the like and can be used to deodorize, decolor, and sterilize water to be processed.

In the ozone generation apparatus according to the present embodiment, the gas pressure p (kPa) of the raw material gas and the discharge gap length d (cm) satisfy the following expression. Therefore, the ozone generation apparatus can generate ozone with a high efficiency.

$$(pd - 250d - 3.16)^2 + 150d \leq 12.5$$

Furthermore, it becomes possible to generate lightweight, inexpensive, highly efficient ozone by making the pressure p of the raw material gas smaller than 0.3 MPa.

In addition, ozone can be generated with a stable ozone concentration and a high efficiency by forming the conductive electrode 21B in the dielectric electrode 21, which is the high voltage electrode, on the inner circumference face of cylindrical glass by means of the sputtering method using a conductor as a target. In particular, the high voltage electrode formed on the inner face of the cylindrical shaped dielectric 21A in the dielectric electrode 21 by means of a sputtering method using stainless steel as a target has excellent corrosion resistance. Thereby, it becomes possible to generate ozone with a stable ozone concentration and a high efficiency.

Furthermore, the conductive electrode 21B may be a conductor formed on an inner circumference face of cylindrical glass, which is a dielectric, by plating. In particular, in the case where the conductive electrode 21B is nickel formed on the inner circumference face of cylindrical glass, which is a dielectric, by plating, the conductive electrode 21B has excellent corrosion resistance and it becomes possible to generate ozone with a stable ozone concentration and a high efficiency.

Furthermore, the ozone generation apparatus can generate ozone with a high efficiency in a state in which radio wave noise generated by the high voltage power supply 13 is essentially suppressed, by setting the frequency of the high voltage power supply 13 in the range of 1 to 3.5 kHz.

Heretofore, several embodiments of the present invention have been described. However, these embodiments are presented as examples, and it is not intended to restrict the scope of the invention. These novel embodiments can be executed in various other forms. Various omissions, replacements, and changes can be conducted without departing from the spirit of the invention. These embodiments and their modifications are contained in the scope and spirit of the invention, and contained in the invention stated in claims and its equivalent scope.

The invention claimed is:

1. An ozone generation apparatus, comprising:
a cylindrical first metal electrode;
a cylindrical second metal electrode disposed coaxially with the cylindrical first metal electrode and disposed in the cylindrical first metal electrode;
a cylindrical dielectric member disposed between the cylindrical first metal electrode and the cylindrical second metal electrode; and
a power supply for applying a voltage between the cylindrical first metal electrode and the cylindrical second metal electrode, wherein
the cylindrical second metal electrode is provided on an inner circumference face of the cylindrical dielectric member,
a discharge gap length d between the cylindrical first metal electrode and the cylindrical dielectric member is set to be in a range of 0.3 to 0.5 mm,
the cylindrical first metal electrode includes a plurality of projections oriented toward an inside of the cylindrical first metal electrode, each projection is formed on an inner surface of the cylindrical first metal electrode from a material of the cylindrical first metal electrode, the cylindrical first metal electrode includes an indent formed on an opposite surface of the cylindrical first metal electrode opposite each respective projection, and
each projection of the plurality of projections is in contact with an outer circumference face of the cylindrical dielectric member, maintains the discharge gap length d, and has a height equivalent to the discharge gap length d, wherein an area at a tip of each projection is smaller than an area of a base of each projection,
dry air is supplied between the cylindrical first electrode and the cylindrical second electrode as raw material gas, a voltage is supplied between the cylindrical first electrode and the cylindrical second electrode from the power supply to generate discharge, and ozone is generated by the discharge,
a pd product, which is a product of the discharge gap length d and a gas pressure p of the raw material gas, is in a range of 6 to 16 kPa cm, and
the discharge gap length d and the gas pressure p of the raw material gas are set to satisfy expression $$(pd-250d-3.16)^2+150d \leq 12.5.$$

2. The ozone generation apparatus according to claim 1, wherein the cylindrical second metal electrode is formed on the inner circumference face of the cylindrical dielectric member by means of a sputtering method using a conductor as a target.

3. The ozone generation apparatus according to claim 2, wherein the conductor is stainless steel.

4. The ozone generation apparatus according to claim 1, wherein the cylindrical second metal electrode is formed by plating a conductor on the inner circumference face of the cylindrical dielectric member.

5. The ozone generation apparatus according to claim 4, wherein the conductor is nickel.

* * * * *